United States Patent
Yang

[19]

[11] Patent Number: 6,064,515
[45] Date of Patent: May 16, 2000

[54] FEEDBACK-TYPE OPTICAL FIBER AMPLIFIER USING HYBRID PUMPING LIGHT BEAMS

[75] Inventor: Tae Su Yang, Seoul, Rep. of Korea

[73] Assignee: Daewoo Telecom Ltd., Incheon, Rep. of Korea

[21] Appl. No.: 08/999,325

[22] Filed: Dec. 29, 1997

[30] Foreign Application Priority Data

Dec. 31, 1996 [KR] Rep. of Korea ..................... 96-78490

[51] Int. Cl.[7] .............................. H01S 3/06; H01S 3/094; G02B 6/28
[52] U.S. Cl. .......................... 359/341; 359/134; 359/160; 372/6
[58] Field of Search ..................................... 359/134, 160, 359/161, 184, 337, 341, 345; 372/6

[56] References Cited

U.S. PATENT DOCUMENTS

| | | | |
|---|---|---|---|
| 4,712,075 | 12/1987 | Snitzer | 359/337 |
| 5,392,153 | 2/1995 | Delavaux | 359/341 |
| 5,745,283 | 4/1998 | Inagaki et al. | 359/341 |
| 5,801,878 | 9/1998 | Bourret et al. | 359/341 |
| 5,808,786 | 12/1998 | Shibuya | 359/341 |

*Primary Examiner*—Nelson Moskowitz
*Attorney, Agent, or Firm*—Bruce E. Lilling

[57] ABSTRACT

A feedback-type optical fiber amplifier using hybrid pumping light beams disclosed, including: an optical line through which an optical signal is propagated; a plurality of rare-earth-doped fibers, doped with a predetermined rare earth ion, being coupled to the optical line in series; a plurality of pumping light sources for outputting pumping light beams having wavelengths different from each other; a plurality of optical coupling means for coupling the pumping light beams to the optical line; and feedback means for dividing the pumping light beam outputted through at least one of the rare-earth-doped fibers, and looping it back to corresponding rare-earth-doped fiber as its input. Therefore, the length of fiber constructing the optical fiber amplifier is reduced, and the amplification efficiency is improved.

9 Claims, 7 Drawing Sheets

FEEDBACK-TYPE OPTICAL FIBER AMPLIFIER USING HYBRID PUMPING LIGHT BEAMS

BACKGROUND OF THE INVENTION

1. Field of the Invention

The present invention relates to an optical fiber amplifier using hybrid pumping light beams, which provides a rare-earth-doped fiber with hybrid pumping light beams to amplify an optical signal, and more particularly relates to a feedback-type optical fiber amplifier using hybrid pumping light beams, which can reduce the amount of active fiber which constructs the optical fiber amplifier, and improve the amplification efficiency, by looping the hybrid pumping light beams back to the rare-earth-doped fiber by a feedback loop.

2. Discussion of Related Art

Optical communication techniques transmitting information through optical fibers have been developed and are widely being used. The optical communication techniques which can transmit large amount of information at high speed, are applied for information communications between countries through submarine cables because they do not suffer from signal disturbance or crosstalk due to electromagnetic induction. As multiplex or network techniques for the optical communications have been developed so far, the optical communication techniques gradually enlarge the range of their application to the key communication networks for high-speed broadband multimedia communications including voice and data communications between switches, cable TV or video on demand (VOD).

The optical communication techniques have been improved according to the development of optical signal amplifiers, which provide high-speed optical signal transmission and superlong-distance transmission. Recently, there have been actively carried out researches about amplifiers having flat gain wavelength, which is used in wavelength multiplex, and high-gain amplifiers for image distribution techniques.

An early optical signal amplifier converts an optical signal into an electric signal through an avalanche-type photodiode to amplify, and reconverts the amplified electric signal into the optical signal using a laser diode. Present optical signal amplifiers employ rare-earth-doped fibers so that the signal conversion process for optical signal amplification can be omitted. The aforementioned rare-earth-doped fiber is formed in a manner that an active optical fiber is doped with a rare earth ion such as Er, Pr and Nd. When a pump light beam having a predetermined wavelength is supplied to the rare-earth-doped fiber, stimulated photon having a predetermined wavelength is emitted due to excitation of the rare earth ion, which amplifies the optical signal propagated through corresponding optical fiber ultimately.

FIG. 1 shows a configuration of a conventional prior art optical fiber amplifier using the rare-earth-doped fiber. Referring to FIG. 1, an optical signal S is coupled with a first optical line 1, and pumping light beam P is coupled with a second optical line 2, first and second optical lines 1 and 2 being coupled to the input of a multiplexer 3. A third optical line 4 corresponding to the output of multiplexer 3 is coupled to a fourth optical line 7 which is the output line through the rare-earth-doped fiber 5 and isolator 6. In this configuration, optical signal S and pumping light bream P applied through first and second optical lines 1 and 2 respectively are coupled with each other by multiplexer 3 so that they are included together in third optical line 4 corresponding to the output of multiplexer 3.

Optical signal S and pumping light beam P are applied to the rare-earth-doped fiber 5 where pumping light beam P excites rare earth ions doped thereinto, to generate stimulated photon having a predetermined wavelength. This light is introduced into optical signal S and effects optical amplification. Isolator 6 prevents opposite optical signals from being introduced into the rare-earth-doped fiber 5, which proceed in a direction opposite to the optical signal S and include, for example, pumping light beam from another rare-earth-doped fiber located in the following stage or reflection signal of the optical signal S. In the above-described optical fiber amplifier, an optical beam having a wavelength of 1520 to 1570 nm is used as optical signal S, and optical beam having a wavelength of 1480 or 980 nm is used as pumping light beam P. Here, the pumping light beam with a wavelength of 1480 nm is used to generate maximum gain, and pumping light beam with a wavelength of 980 nm is used to provide low noise characteristic. Accordingly, both 1480 nm and 980 nm pumping light beams are widely used in various optical transmission systems.

FIG. 2 shows a configuration of a conventional prior art optical fiber amplifier using the aforementioned hybrid pumping light beams. Referring to FIG. 2, optical signal S is coupled with a first optical line 21, and a first pumping light beam P1 having a predetermined wavelength, for example, 1480 nm, is coupled with a second optical line 22. First and second optical lines 21 and 22 are coupled to the input of a first wavelength division multiplexer 23 which couples optical signal S and first pumping light beam P1 to a third optical line 24 connected to an input of a second wavelength division multiplexer 26. A second pumping light beam P2 having a predetermined wavelength, for example, 980 nm, is coupled with a fourth optical line 25 which is connected to the other input of second multiplexer 26. Second multiplexer 26 couples optical signal S and first pumping light beam P1 supplied through third optical line 24 and second pumping light beam P2 sent through fourth optical line 25, to output them through a fifth optical line 27 which is connected to the input of rare-earth-doped fiber 28. The output light beam of rare-earth-doped fiber 28 is coupled with a sixth optical line 30 corresponding to an output line through an isolator 29.

In this configuration, optical signal S and first pumping light beam P1 are coupled by first multiplexer 23, and the output of first multiplexer 23 and second pumping light beam P2 are coupled in second multiplexer 26. Then, the coupled optical signal S, first and second pumping light beams P1 and P2 are supplied from second multiplexer 26 to rare-earth-doped fiber 28. First and second pumping light beams P1 and P2 excite rare earth ions of rare-earth-doped fiber 28, to generate stimulated photon which is introduced into optical signal S to be amplified.

However, this optical fiber amplifier has the following problems. An optimum length of rare-earth-doped fiber 28 is generally set according to the wavelength of pumping light used as exciting light. For example, when the wavelength of pumping light is 1480 nm, the optimum length is set to approximately 15 m, and, when 980 nm, it is set to approximately 9 m. When the actual length of the rare-earth-doped fiber is shorter than the optimum length, its amplification efficiency is deteriorated. On the other hand, if longer, optical signal attenuation occurs. With the above-described conventional optical fiber amplifier configuration, since the first and second pumping light beams coupled by the multiplexer are supplied to the rare-earth-doped fiber, it is impossible to adequately set the length of the rare-earth-doped fiber according to them.

Meanwhile, U.S. Pat. No. 5,185,826 has been proposed an optical fiber amplifier which effectively amplifies optical signals using hybrid pumping light beams, which is shown in FIG. 3. Referring to FIG. 3, an optical signal S and first pumping light beam P1 with a first wavelength are coupled by a first multiplexer 31 whose output light beams P1 and S are supplied to a first rare-earth-doped fiber 32. Optical signal S has a wavelength of 1520 to 1570 nm, first pumping light beam P1 has, for example, a wavelength of 1480 nm, and first rare-earth-doped fiber 32 is constituted of, for example, active optical fibers doped with Er.

The output of first rare-earth-doped fiber 32 is coupled to an input of a second multiplexer 33, and second pumping light beam P2 having a wavelength of 980 nm is coupled to its other input. Second multiplexer 33 couples light beams P1 and S from rare-earth-doped fiber 32 and second pumping light beam P2, and supplies them to a second rare-earth-doped fiber 34 whose output is coupled to an output optical line 9 through an isolator 35. In this configuration, when the length of first rare-earth-doped fiber is L1, and the length of second rare-earth-doped fiber is L2, the length of L1+L2 is set as an optimum length for first pumping light beam P1, and length L2 is set as an optimum length for second pumping light beam P2.

First pumping light beam P1 coupled through first multiplexer 31 is applied to first rare-earth-doped fiber 32 to excite the rare earth ion doped thereinto, thus effecting optical amplification. Here, since the length of first rare-earth-doped fiber 32 is set shorter than an optimum length for first pumping light beam P1, first pumping light beam P1 applied to rare-earth-doped fiber 32 is not all lost in first rare-earth-doped fiber 32 but some of it remains. The residual first pumping light beam P1 outputted from first rare-earth-doped fiber 32 is coupled with second pumping light beam P2 by second multiplexer 33, and they are applied to second rare-earth-doped fiber 34 where first and second pumping light beams P1 and P2 carry out amplification operation. That is, since first pumping light beam P1 executes amplification in both first and second rare-earth-doped fibers 31 and 34, the length of rare-earth-doped fiber for first pumping light beam P1 is set to L1+L2. And the length of rare-earth-doped fiber for second pumping light beam P2 is set to L2 because second pumping light beam P2 performs amplification operation only in second rare-earth-doped fiber 34. Accordingly, the effective optical fiber amplifier can be realized using hybrid pumping light beams.

However, the rare-earth-doped fiber used in the above optical fiber amplifier is fabricated through complicated processes and highly expensive. This requires that the length of rare-earth-doped fiber is reduced. Furthermore, in the aforementioned optical fiber amplifier, the pumping light beam used as the exciting light of the rare-earth-doped fiber corresponds to noise signal in terms of the optical signal transmitted through corresponding optical fiber. Accordingly, to prevent the residual pumping light in the rare-earth-doped fiber from being transmitted through the optical fiber, the conventional optical fiber amplifier has a reflection mirror at its output terminal, to reflect the pumping light beam. However, the reflection mirror reflects not only the pumping light beam outputted from the rare-earth-doped fiber but also a portion of the optical signal transmitted through the optical fiber. Thus, it may deteriorate the output level of the optical signal.

SUMMARY OF THE INVENTION

Accordingly, the present invention is directed to a feedback-type optical fiber amplifier using hybrid pumping light beams that substantially obviates one or more of the problems due to limitations and disadvantages of the related art.

An object of the present invention is to provide an optical fiber amplifier which remarkably reduces the length of an rare-earth-doped fiber used therein.

A further object of the present invention is to provide an optical fiber amplifier which prevents residual pumping light beam from being outputted from a corresponding rare-earth-doped fiber, without using a reflection mirror.

Another object of the present invention is to provide an optical fiber amplifier which optimizes its amplification efficiency, to thereby efficiently use the electric power.

Additional features and advantages of the invention will he set forth in the description which follows, and in part will be apparent from the description, or may be learned by practice of the invention. The objectives and other advantages of the invention will be realized and attained by the structure particularly pointed out in the written description and claims hereof as well as the appended drawings.

To accomplish the objects of the invention, there is provided a feedback-type optical fiber amplifier using hybrid pumping light beams, including: an optical line through which an optical signal is propagated; a plurality of rare-earth-doped fibers, doped with a predetermined rare earth ion, being coupled to the optical line in series; a plurality of pumping light sources for outputting pumping light beams having wavelengths different from each other; a plurality of optical coupling means for coupling the pumping light beams to the optical line; and feedback means for dividing the pumping light beam outputted through at least one of the rare-earth-doped fibers, and looping it back to corresponding rare-earth-doped fiber as its input.

To accomplish the objects of the present invention, there is also provided a feedback-type optical fiber amplifier using hybrid pumping light beams, including: an optical line through which an optical signal is propagated; first and second rare-earth-doped fibers, doped with a predetermined rare earth ion, being coupled to the optical line in series; a first pumping light source for outputting a first pumping light beam having a predetermined first wavelength; a second pumping light source for outputting a second pumping light beam having a predetermined second wavelength different from the first wavelength; first and second multiplexers for coupling the first and second pumping light beams to the optical line, respectively; and feedback means for dividing the pumping light beam outputted through at least one of the first and second rare-earth-doped fibers, and looping it back to corresponding rare-earth-doped fiber as its input.

According to the present invention, the total length of the first and second rare-earth-doped fibers is decided according to one of first and second pumping light beams, which has shorter wavelength, and the feedback means loops back one of the first and second pumping light beams, which has longer wavelength. The total length of the first and second rare-earth-doped fibers is set on the basis of one of pumping light beams used as exciting light beams, which has shorter wavelength. Accordingly, the amount of the rare-earth-doped fiber used in the optical fiber amplifier can be remarkably reduced.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
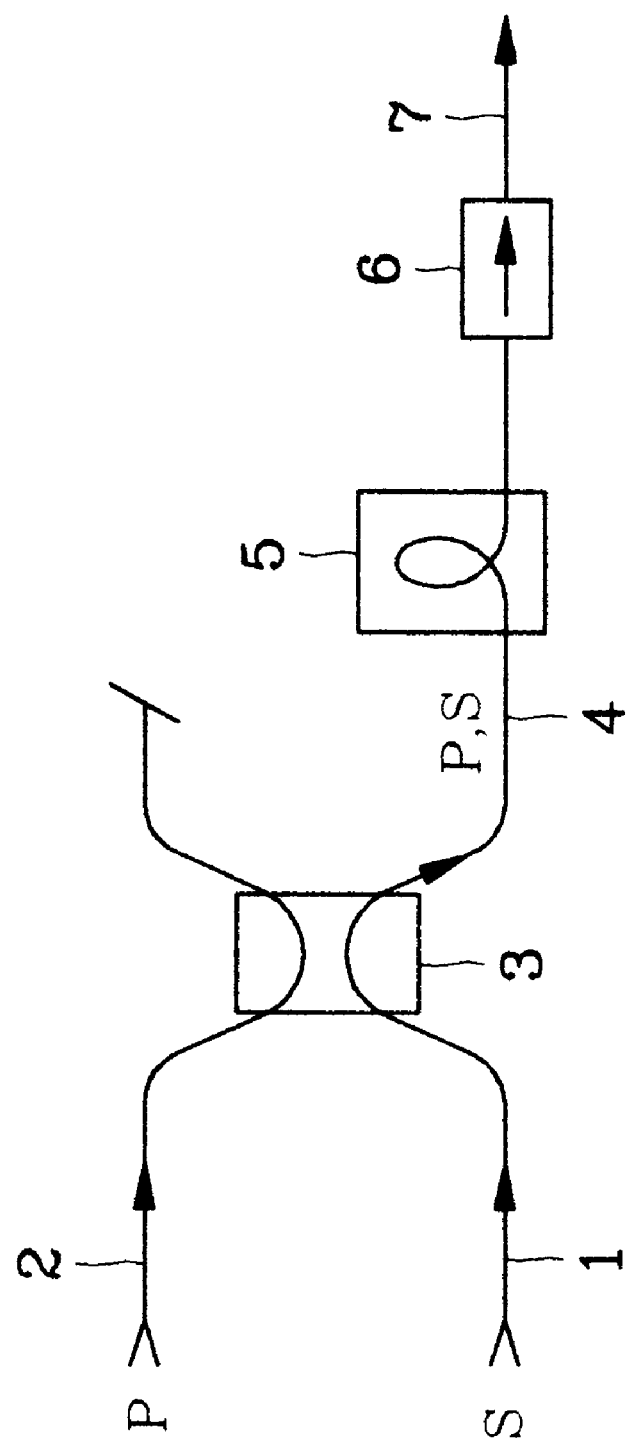
FIG. 1 shows a configuration of a conventional prior art optical fiber amplifier.
Figure 2:
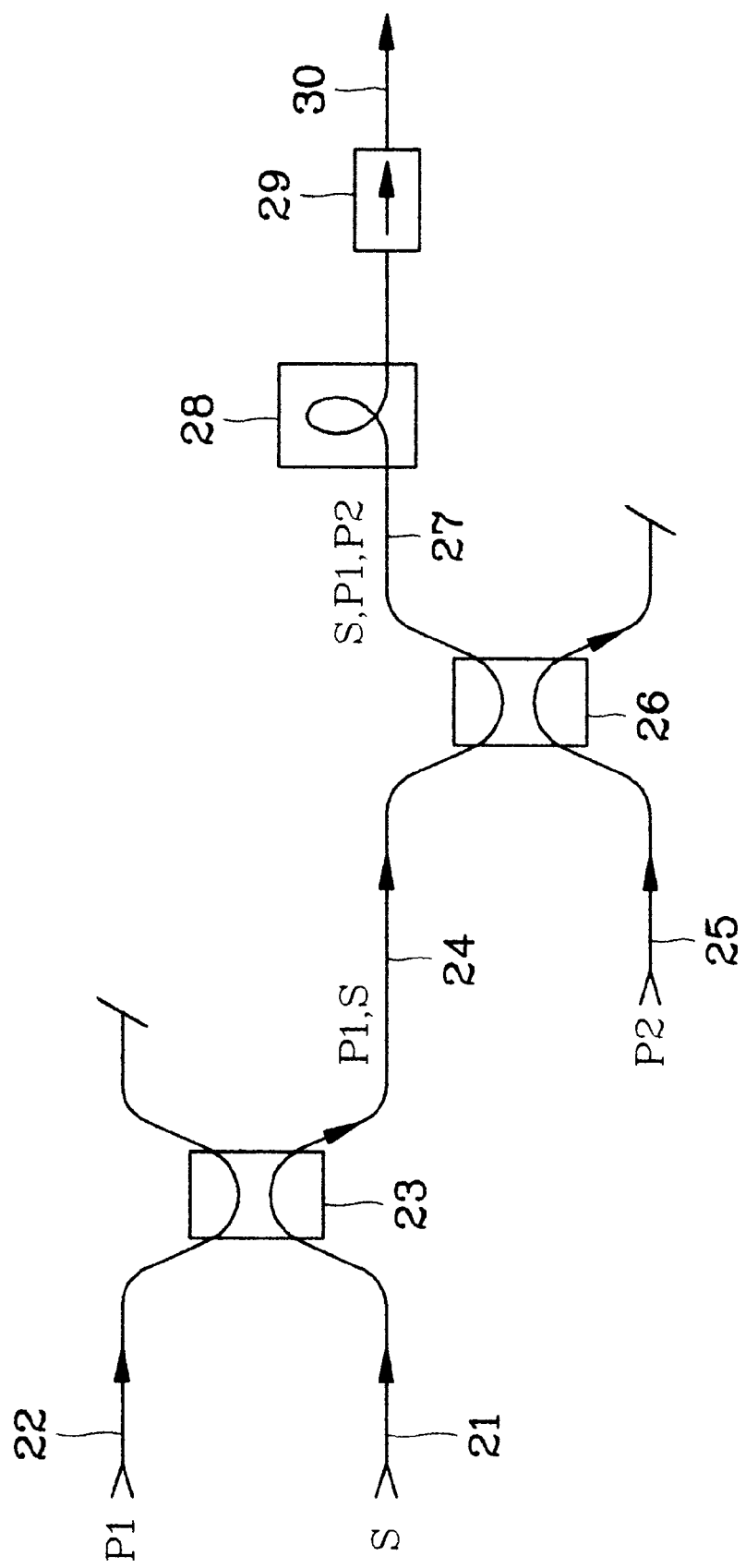
FIG. 2 shows a configuration of a conventional prior art optical fiber amplifier using hybrid pumping light beams.
Figure 3:
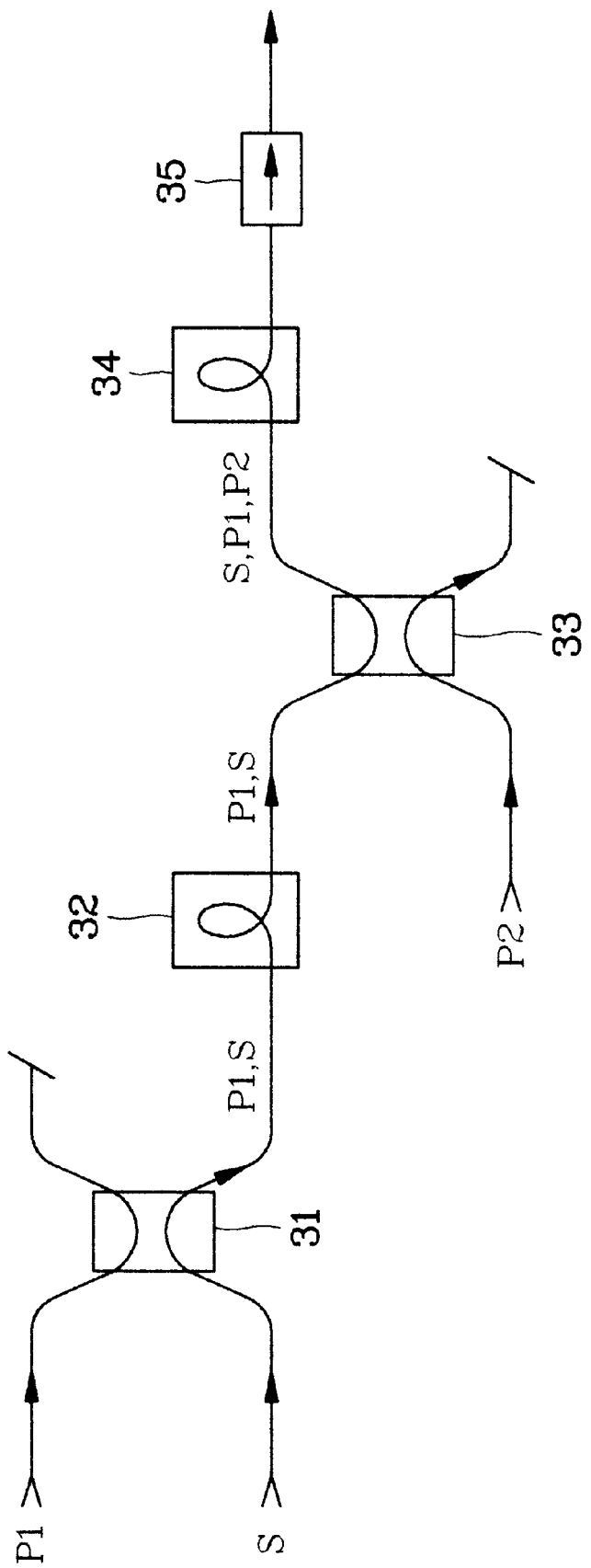
FIG. 3 shows a configuration of another conventional prior art optical fiber amplifier using hybrid pumping light beams.
Figure 4:
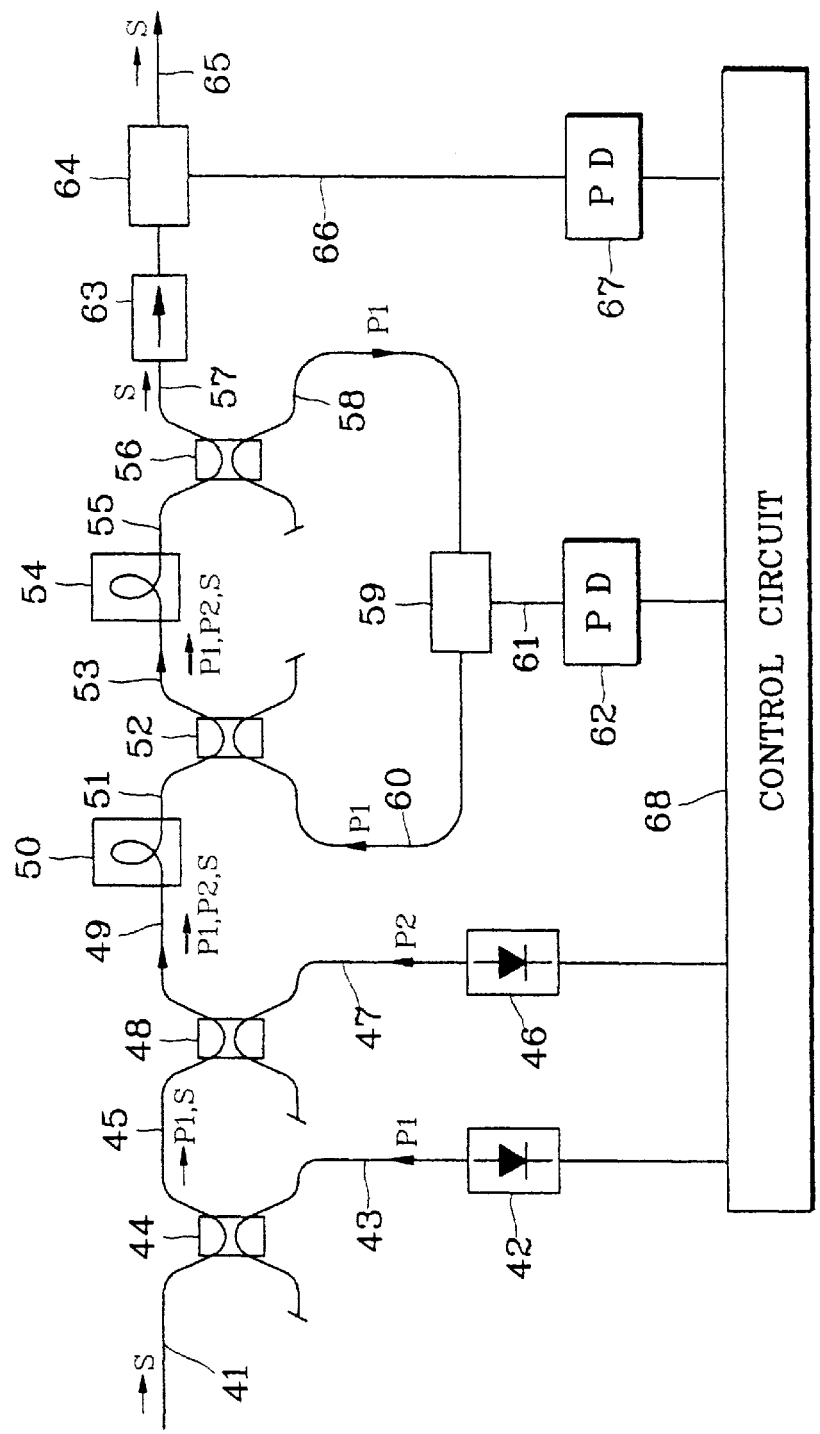
FIG. 4 shows a configuration of a feedback-type optical fiber amplifier using hybrid pumping light beams according to a first embodiment of the present invention.

FIG. 4 shows a configuration of a feedback-type optical fiber amplifier using hybrid pumping light beams according to the first embodiment of the present invention. Referring to FIG. 4, an input optical signal S is coupled with a first optical line 41, and a first pumping light beam P1 having a first wavelength supplied from a first laser diode 42 is coupled with a second optical line 43. First and second optical lines 41 and 43 are provided as the input of a first wavelength division multiplexer 44. Optical signal S has a wavelength of 1520 to 1570 nm band, and first pumping light beam P1 has a wavelength of 1480 nm band, for example. The output power of first laser diode 42 is determined according to operation current supplied from a control circuit 68. The output light beam from first multiplexer 44 is coupled with a third optical line 45, and a second pumping light beam P2 having a second wavelength different from the first wavelength and supplied from a second laser diode 46 is coupled with a fourth optical line 47. Third and fourth optical lines 45 and 47 are provided as the input of a second wavelength division multiplexer 48. Here, second pumping light beam p2 has a wavelength of 980 nm, for example. The output power of second laser diode 46 is determined according to operation current supplied from a control circuit 68.

The output light beam from second multiplexer 48 is coupled with a fifth optical line 49 which is connected to the input of a first rare-earth-doped fiber 50. First rare-earth-doped fiber 50 is constituted of an active optical fiber doped with a rare earth ion, its length being set to L1. The output light beam from first rare-earth-doped fiber 50 is coupled with a sixth optical line 51 which is connected to a seventh optical line 53 by means of a third wavelength division multiplexer 52, with hardly having any loss. Seventh optical line 53 is connected to the input of a second rare-earth-doped fiber 54 which is constituted of an active optical fiber doped with a rare earth ion, for example, aa same as the first rare-earth-doped fiber, and its length is set to L2.

The output light beam from second rare-earth-doped fiber 54 is coupled with an eightth optical line 55 which is connected to the input of a fourth wavelength division multiplexer 56. Fourth multiplexer 56 couples input optical signal S to a ninth optical line 57, while producing hardly any loss, and performs wavelength division for first pumping light beam P1 and couples it to a tenth optical line 58. Tenth optical line 58 is connected to an eleventh optical line 60 by means of a first tap coupler 59, and eleventh optical line 60 is connected to the input of third multiplexer 52. Third multiplexer 52 supplies first pumping light beam P1 from eleventh optical line 60 to second rare-earth-doped fiber 54, coupling it to seventh optical line 53. Here, tenth and eleventh optical lines 58 and 60 construct a feedback loop for first pumping light beam P1.

First tap coupler 59 divides first pumping light beam P1 applied thereto through tenth optical line 58 in a predetermined ratio, for example, 99:1, and couples a divided portion of first pumping light beam P1 to a twelfth optical line 61 which is connected to the input of a first photodiode 62. First photodiode 62 photoelectric-converts first pumping light beam P1 applied and provides it to control circuit 68 as a monitor signal. Ninth optical line 57 with which optical signal S from fourth multiplexer 56 is coupled is connected to a second tap coupler 64 through an isolator 63 for blocking a reflective light beam. Second tap coupler 64 couples input optical signal S to twelfth and thirteenth optical lines 65 and 66 in a predetermined ratio, for example, 99:1. A portion of optical signal S coupled with twelfth line 65 is transmitted as an output signal, and a portion of optical signal S coupled with thirteenth line 66 is photoelectric-converted through a second photodiode 67 to be applied to control circuit 66 as a monitor signal.

Control circuit 68 controls the amount of operation current supplied to first or second laser diode 42 or 46 on the basis of the monitor signals applied thereto through first and second photodiodes 62 and 67. When the level of the monitor signal from first photodiode 62 is high, control circuit 68 reduces the amount of operation current supplied to first laser diode 42, and when the level of the monitor signal from second photodiode 67 is low, it increases the amount of operation current supplied to first or second laser diode 42 or 46, thereby controlling the optical fiber amplifier in an optimum state. With the optical fiber amplifier having the above configuration, optical signal S applied through first line 41 and first pumping light beam P1 generated from first laser diode 42 are coupled by first multiplexer 44 to be outputted through third line 45. Accordingly, the output light beam from third optical line 45 includes optical signal S and first pumping light beam P1.

Subsequently, optical signal S and first pumping light beam P1 propagated through third line 45 are coupled with second pumping light beam P2 from second laser diode 46 by second multiplexer 48. Thus, fifth optical line 49 corresponding to the output of second multiplexer 48 includes optical signal S, first and second pumping light beams P1 and P2. These light beams S, P1 and P2 are transmitted through first rare-earth-doped fiber 50, third multiplexer 52 and second rare-earth-doped fiber 54. In first and second rare-earth-doped fibers 50 and 54, the rare earth ions doped thereinto are excited by first and second pumping light beams P1 and P2, so that stimulated photon is emitted and this stimulated photon is introduced into optical signal S being transmitted, thereby amplifying it. Optical signal S amplified in second rare-earth-doped fiber 54 is coupled with ninth optical line 57 by fourth multiplexer 56, while having hardly any loss, and transmitted through isolator 63.

Meantime, the sum of lengths of first and second rare-earth-doped fibers 50 and 54, that is, L1+L2, is set as an optimum length for second pumping light beam P2 having a wavelength of 980 nm, for example. Accordingly, second pumping light beam P2 is almost consumed during the transmission through first and second rare-earth-doped fibers 50 and 54. However, in case of first pumping light beam P1 having a wavelength of 1480 nm with which an optimum length of the rare-earth-doped fiber is set longer than the length of the pumping light beam P2, all of first pumping light beam P1 is not consumed in first and second rare-earth-doped fibers 50 and 54, but a predetermined amount of the light beam will remain therein.

The residual first pumping light beam P1 outputted from second rare-earth-doped fiber 54 is coupled to the feedback loop constituted of tenth and eleventh optical lines 58 and 60 through fourth multiplexer 56, and then coupled with seventh optical line 53 through third multiplexer 52, to be looped back to second rare-earth-doped fiber 54. In this case, accordingly, the length of the rare-earth-doped fiber for first pumping light beam P1 is set to L1+2L2, and it may be also set to, for example, L1+3L2, L1+4L2, . . . according to the output power of first laser diode 42 outputting first pumping light beam P1.

In other words, as the length of second rare-earth-doped fiber 54 for first pumping light beam P1 substantially becomes longer due to the feedback loop constituted of tenth and eleventh optical lines 58 and 60, it is possible to set an optimum length of the rare-earth-doped fiber for first pumping light beam P1 as same as that for second pumping light beam P2. Furthermore, in the aforementioned configuration, second pumping light beam P2 is all consumed by first and second rare-earth-doped fibers 50 and 54, and first pumping light beam P1 outputted from second rare-earth-doped fiber 54 is coupled with feedback loop 58 and 60 through fourth multiplexer 56, so it is possible to prevent the pumping light beams from being transmitted through the optical fibers without setting a separate reflection mirror. Moreover, control circuit 68 controls the output of first or second laser diode 42 or 46 on the basis of the monitor signals supplied from first and second photodiodes 62 and 67. Accordingly, the amplification efficiency of the entire optical fiber amplifier can be controlled in an optimum state.

Figure 5:
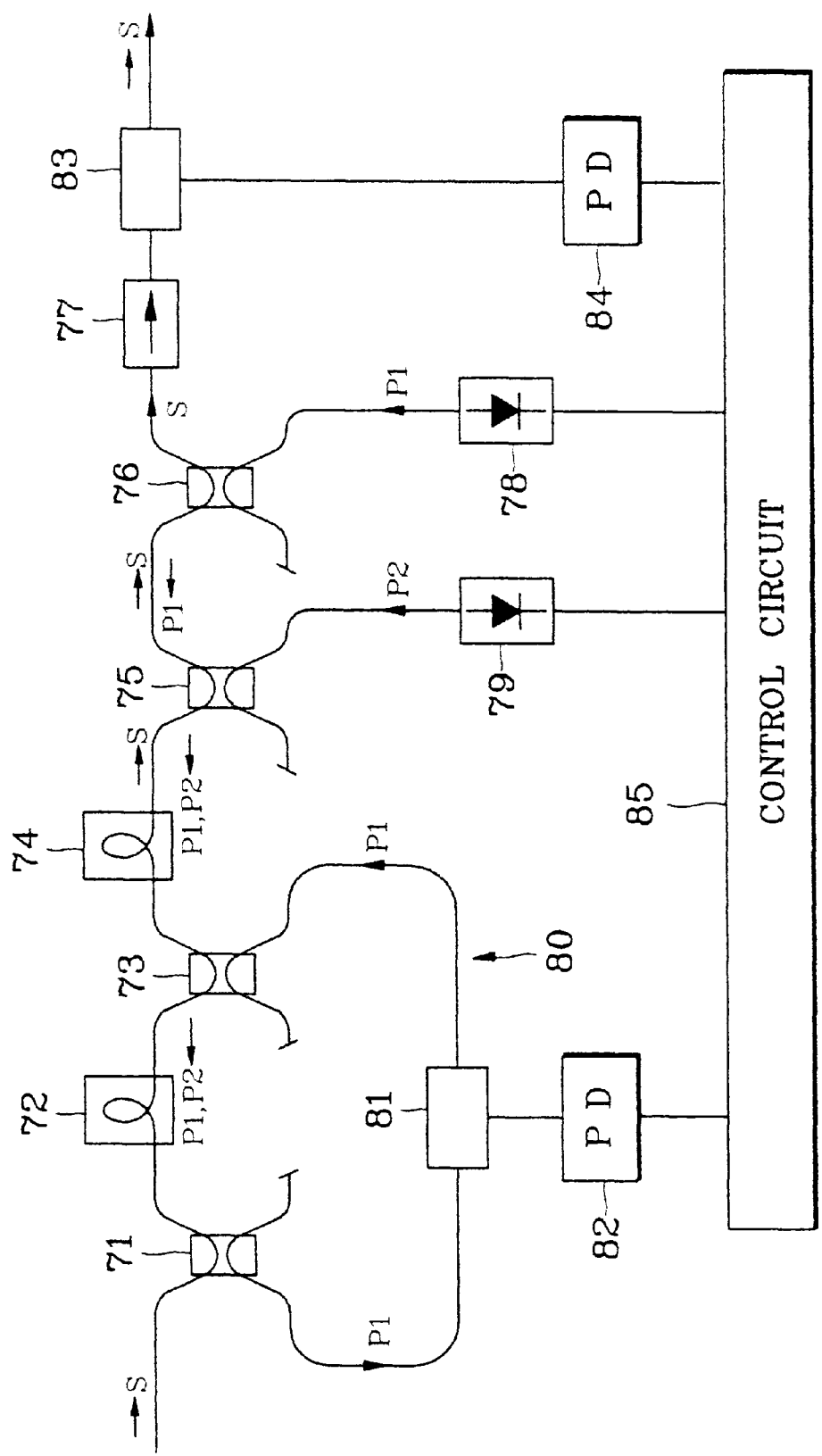
FIG. 5 shows a configuration of a feedback-type optical fiber amplifier using hybrid pumping light beams according to a second embodiment of the present invention.

FIG. 5 shows a configuration of a feedback-type optical fiber amplifier using hybrid pumping light beams according to the second embodiment of the present invention. In this embodiment, the optical fiber amplifier is constructed in a reverse-direction excitation mode in which the pumping light beam is provided in a direction opposite to the optical signal, in contrast to the above-described first embodiment constructed in a forward-direction excitation mode in which the pumping light beam and optical signal light beam are propagated in the same direction.

Referring to FIG. 5, optical signal S being transmitted is coupled with a first rare-earth-doped fiber 72 by means of a first wavelength division multiplexer 71, and then coupled with a second rare-earth-doped fiber 74 through a second wavelength division multiplexer 73. Optical signal S amplified by first and second rare-earth-doped fibers 72 and 74 is transmitted through third and fourth wavelength division multiplexers 75 and 76, while hardly having any loss, to be coupled to an isolator 77. Reference numeral 78 denotes a first laser diode driven with operation current supplied from a control circuit 85 to generate a first pumping light beam P1 having a predetermined wavelength, and 79 denotes a second laser diode driven with operation current supplied from control circuit 85 to generate a second pumping light beam P2 having a wavelength different from that of first pumping light beam P1.

First pumping light beam P1 supplied from first laser diode 78 is coupled to the input of fourth multiplexer 76 to be transmitted in a direction opposite to optical signal S, and second pumping light beam P2 from second laser diode 79 is coupled to the input of third multiplexer 75 to be transmitted in a direction opposite to optical signal S. First and second pumping light beams P1 and P2 transmitted in a direction opposite to optical signal S are coupled to the input of second rare-earth-doped fiber 74, and residual first and second pumping light beams in second rare-earth-doped fiber are coupled to the input of first rare-earth-doped fiber 72. Here, the wavelengths of first and second pumping light beams P1 and P2 are respectively set to 1480 nm and 980 nm, for example. When the lengths of first and second rare-earth-doped fibers 72 and 74 is L1 and L2, respectively, the total length of first and second rare-earth-doped fibers 72 and 74, L1+L2, is set as the optimum length for second pumping light beam P2. Accordingly, as described above, all of the first pumping light beam P1 is not consumed in first and second rare-earth-doped fibers 72 and 74, but a little amount of the beam is outputted through first rare-earth-doped fiber 72.

The residual first pumping light beam P1 outputted from first rare-earth-doped fiber 72 is wavelength-divided by first multiplexer 71 to be coupled to a feedback loop 80, and looped back to first rare-earth-doped fiber 72 by second multiplexer 73. Feedback loop 80 includes a first tap coupler 81 which divides first pumping light beam P1 passing through feedback loop 80 in a predetermined ratio, for example, 99:1, and a portion of first pumping light beam divided by first tap coupler 81 is converted into an electric signal through a first photodiode 82, to be applied to a control circuit 85 as a monitor signal.

Optical signal S outputted through isolator 77 is coupled to a second tap coupler 83 which divides optical signal S in a predetermined ratio, for example, 99:1. A photodiode 84 coupled to the output of second tap coupler 83 photoelectric-converts the optical signal S and applies it to control circuit 85 as a monitor signal. Control signal 85 controls the amount of operation current provided from first and second laser diodes 78 and 79 on the basis of the monitor signals supplied from first and second photodiodes 82 and 84, the same with the above-described first embodiment.

That is, in the second embodiment of the invention, first pumping light beam P1 with 1480 nm band and second pumping light beam P2 with 980 nm band outputted from first and second laser diodes 78 and 79 respectively are transmitted in a direction opposite to optical signal S, to be coupled with first and second rare-earth-doped fibers 72 and 74. The total length, L1+L2, of the rare-earth-doped fiber consisting of first and second rare-earth-doped fibers 72 and 74 is set to be suitable for second pumping light beam P2 with a wavelength of 980 nm, and the residual first pumping light beam P1 with 1480 nm band outputted from first rare-earth-doped fiber 72 is looped back thereto by feedback loop 80. Accordingly, since the lengths of first and second rare-earth-doped fibers 72 and 74 are set on the basis of the pumping light beam having a wavelength of 980 nm, approximately 6 m long rare-earth-doped fiber can be reduced compared to the conventional one. Furthermore, control circuit 85 controls the output of first and second laser diodes 78 and 79 on the basis of the monitor signals applied from first and second photodiodes 82 and 84, to optimize the power efficiency of the rare-earth-doped fibers. Moreover, since first and second pumping light beams P1 and P2 are transmitted in a direction opposite to optical signal S, and first pumping light beam P1 outputted from first rare-earthdoped fiber 72 is continuously provided to first rare-earth-doped fiber 72 through feedback loop 80, it is possible to prevent the residual pumping light beam from being transmitted through the optical lines.

Figure 6:
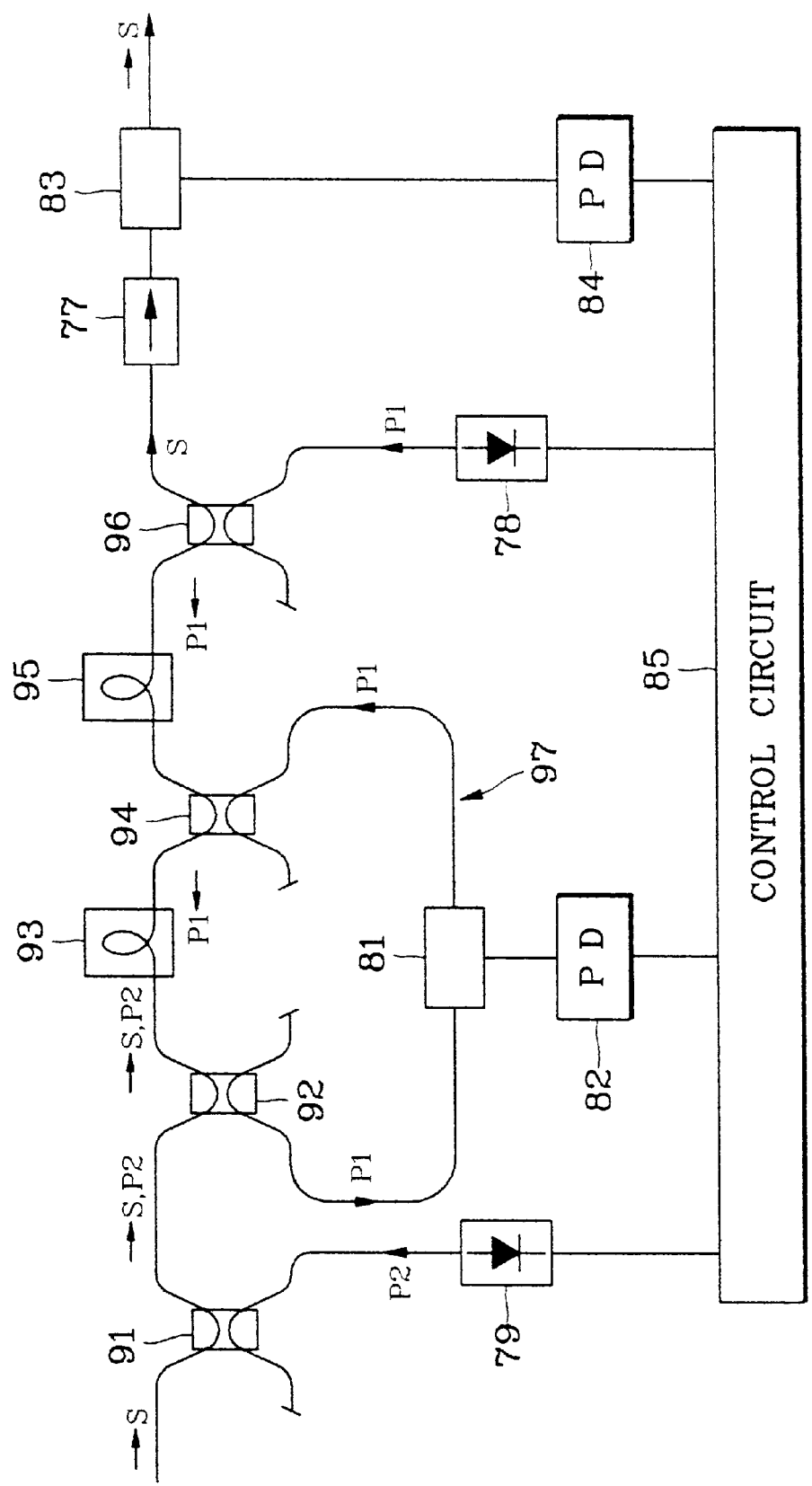
FIG. 6 shows a configuration of a feedback-type optical fiber amplifier using hybrid pumping light beams according to a third embodiment of the present invention.

FIG. 6 shows a configuration of an optical fiber amplifier having a pumping light beam reflecting loop according to the third embodiment of the present invention, in which the optical fiber amplifier is applied to bidirectional excitation mode. In FIGS. 5 and 6, like components are indicated by like reference numerals and the detailed description will be omitted. Referring to FIG. 6, input optical signal S and second pumping light beam P2 with a wavelength of 980 nm, for example, outputted from second laser diode 79, are coupled by a first wavelength division multiplexer 91, and pass through a second wavelength division multiplexer 92, while having hardly any loss, to be supplied to a first rare-earth-doped fiber 93.

Optical signal S and second pumping light beam P2 outputted from first rare-earth-doped fiber 93 pass through a third wavelength division multiplexer 94, while having hardly any loss, to be coupled to the input of a second rare-earth-doped fiber 95. Optical signal S outputted from second rare-earth-doped fiber 95 is coupled to isolator 77 through a fourth wavelength division multiplexer 96. First pumping light beam P1 with a wavelength of 1480 nm, generated from first laser diode 78, is coupled to the input of fourth multiplexer 96 to be applied to second rare-earth-doped fiber 95. First pumping light beam P1 outputted from second rare-earth-doped fiber 95 is supplied to first rare-earth-doped fiber 93 through third multiplexer 94.

The sum of lengths of first and second rare-earth-doped fibers 93 and 95 is set as an optimum length for second pumping light beam P2 with a wavelength of 980 nm. Accordingly, while most of second pumping light beam P2 is consumed during the transmission through first and second rare-earth-doped fibers 93 and 95, first pumping light beam P1 is not all lost but left therein in a predetermined amount. The residual first pumping light beam P1 outputted from first rare-earth-doped fiber 93 is coupled to a feedback loop 97 through second multiplexer 92 and looped back to first rare-earth-doped fiber 93 by third multiplexer 94, and it is consumed therein. Accordingly, the total length of first and second rare-earth-doped fibers 93 and 95 can be set on the basis of second pumping light beam P2 with a wavelength of 980 nm.

Figure 7:
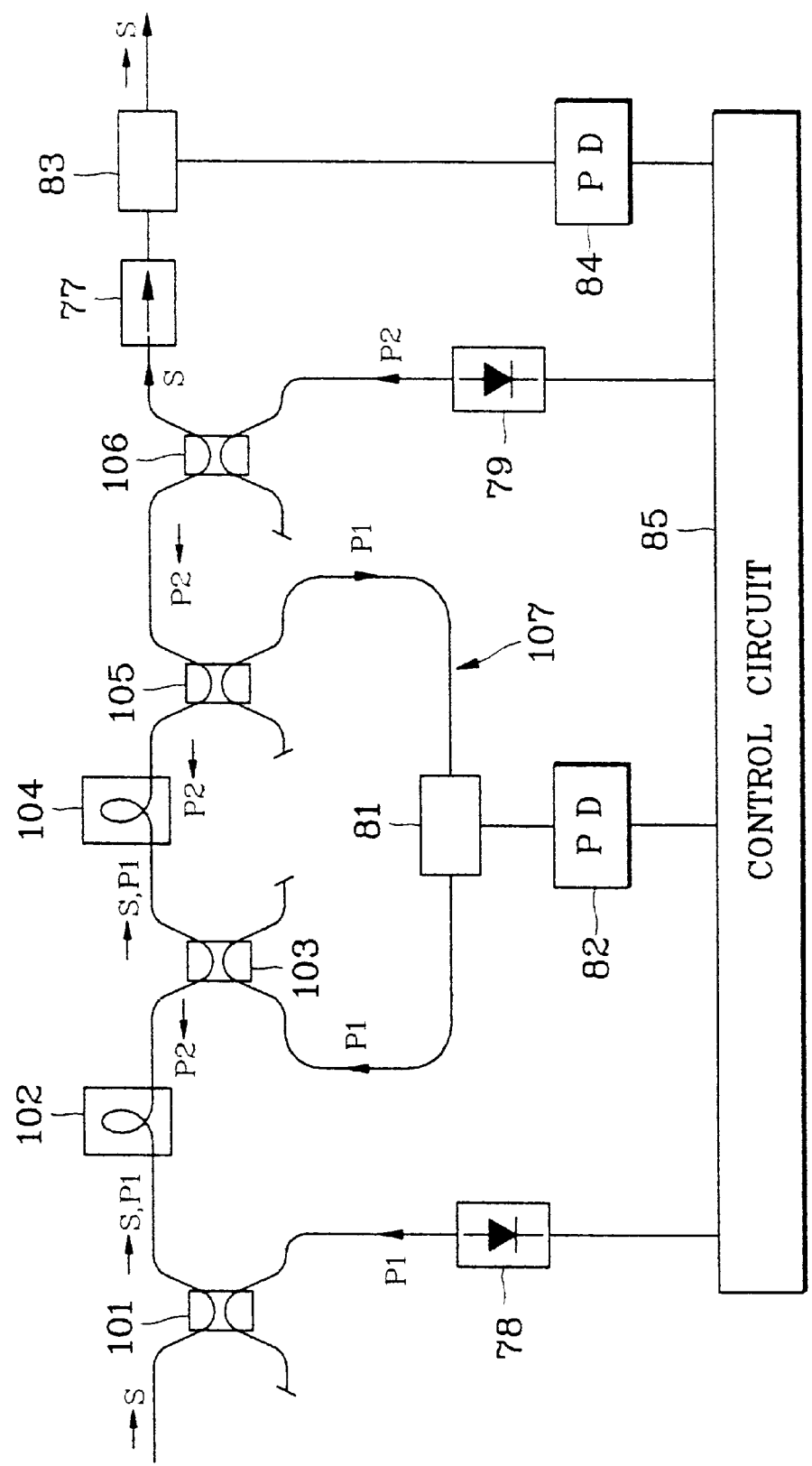
FIG. 7 shows a configuration of a feedback-type optical fiber amplifier using hybrid pumping light beams according to another embodiment of the present invention.

FIG. 7 shows a configuration of the optical fiber amplifier in bidirectional excitation mode shown in FIG. 6 according to another embodiment of the present invention, in which first pumping light beam P1 with a wavelength of 1480 nm is used as a forward-direction exciting light, and second pumping light beam P2 with a wavelength of 980 nm is used as a reverse-direction exciting light. In FIGS. 6 and 7, like components are indicated by like reference numerals, and the detailed description will be omitted. Referring to FIG. 7, optical signal S and first pumping light beam P1 having a wavelength of 1480 nm, outputted from first laser diode 78, are coupled by a first wavelength division multiplexer 101, and the output light beam of first multiplexer 101 is coupled with a first rare-earth-doped fiber 102.

The output light beam of first rare-earth-doped fiber 102 passes through a second wavelength division multiplexer 103, while having hardly any loss, to be coupled to the input of a second rare-earth-doped fiber 104. The output light beam of second rare-earth-doped fiber 104 passes through third and fourth wavelength division multiplexers 105 and 106, while having hardly any loss, to be coupled to isolator 77. The residual first pumping light beam P1 outputted from second rare-earth-doped fiber 104 is wavelength-divided by third multiplexer 105 to be coupled to a feedback loop 107, and looped back to second rare-earth-doped fiber 104 by second multiplexer 103. Second pumping light beam P2 with a wavelength of 980 nm, outputted from second laser diode 79, passes through fourth multiplexer 106, and is transmitted in a direction opposite to optical signal S, to be coupled to the input of second rare-earth-doped fiber 104 through third multiplexer 105. The residual second pumping light beam P2 outputted from second rare-earth-doped fiber 104 passes through second multiplexer 103, while having hardly any loss, to be applied to first rare-earth-doped fiber 102.

In this embodiment, the total length of first and second rare-earth-doped fibers 102 and 104 is set on the basis of second pumping light beam P2 with a wavelength of 980 nm. The residual first pumping light beam P1 outputted from second rare-earth-doped fiber 104 is looped back to second rare-earth-doped fiber 104 by feedback loop 107. Accordingly, since the length of the rare-earth-doped fiber can be set on the basis of the pumping light beam with 980 nm band, the amount of rare-earth-doped fiber used can be remarkably reduced compared to the conventional one.

According to the present invention, as described above, it is possible to realize the feedback-type optical fiber amplifier using hybrid pumping light beams, which prevents the residual pumping light from being transmitted through the optical lines, and shortens the length of rare-earth-doped fiber used in the optical fiber amplifier. Furthermore, it improves the amplification efficiency of the optical fiber amplifier as most of the pumping light is consumed in the rare-earth-doped fiber.

It will be apparent to those skilled in the art that various modifications and variations can be made in the feedback-type optical fiber amplifier using two kinds of pumping light beams of the present invention without departing from the spirit or scope of the invention. Thus, it is intended that the present invention cover the modifications and variations of this invention provided they come within the scope of the appended claims and their equivalents.

What is claimed is:

1. A feedback-type optical fiber amplifier using hybrid pumping light beams, comprising:

an optical line through which an optical signal is propagated;

a plurality of rare-earth-doped fibers, doped with a predetermined rare earth ion, being coupled to the optical line in series;

a plurality of pumping light sources for outputting pumping light beams having wavelengths different from each other;

a plurality of optical coupling means for coupling the pumping light beams to the optical line; and feedback means for separating the pumping light beam outputted through at least one of the rare-earth-doped fibers from the optical signal, and looping it back to an input of that same rare-earth-doped fiber.

2. A feedback-type optical fiber amplifier using hybrid pumping light beams, comprising:

an optical line through which an optical signal is propagated;

first and second rare-earth-doped fibers, doped with a predetermined rare earth ion, being coupled to the optical line in series;

a first pumping light source for outputting a first pumping light beam having a predetermined first wavelength;

a second pumping light source for outputting a second pumping light beam having a predetermined second wavelength different from the first wavelength;

first and second multiplexers for coupling the first and second pumping light beams to the optical line, respectively; and feedback means for dividing the pumping light beam outputted through at least one of the first and second rare-earth-doped fibers, and looping it back to the same rare-earth-doped fiber as its input.

3. The optical fiber amplifier as claimed in claim 2, wherein the total length of the first and second rare-earth-doped fibers is set on the basis of one of first and second pumping light beams, which has shorter wavelength.

4. The optical fiber amplifier as claimed in claim 2 or 3, wherein the feedback means loops back one of the first and second pumping light beams, which has longer wavelength.

5. The optical fiber amplifier as claimed in claim 2, wherein the first and second pumping light beams are transmitted in the same direction as the optical signal.

6. The optical fiber amplifier as claimed in claim 2, wherein the first and second pumping light beams are transmitted in a direction opposite to the optical signal.

7. The optical fiber amplifier as claimed in claim 2, wherein the first and second pumping light beams are transmitted through the optical line in directions opposite to each other.

8. The optical fiber amplifier as claimed in claim 2, further comprising;

pumping light beam detecting means for detecting the amount of pumping light beam looped back by the feedback means; and control means for controlling the output level of the first or second pumping light source, on the basis of the amount of pumping light beam detected by the pumping light beam detecting means.

9. The optical fiber amplifier as claimed in claim 2, further comprising;

optical signal detecting means for detecting the amount of optical signal amplified by the first and second rare-earth-doped fibers; and control means for controlling the output level of the first or second pumping light source, on the basis of the amount of optical signal detected by the optical signal detecting means.

* * * * *